O. H. P. G. SPENCER.
NUT LOCK.
APPLICATION FILED JULY 6, 1910.
970,274.
Patented Sept. 13, 1910.
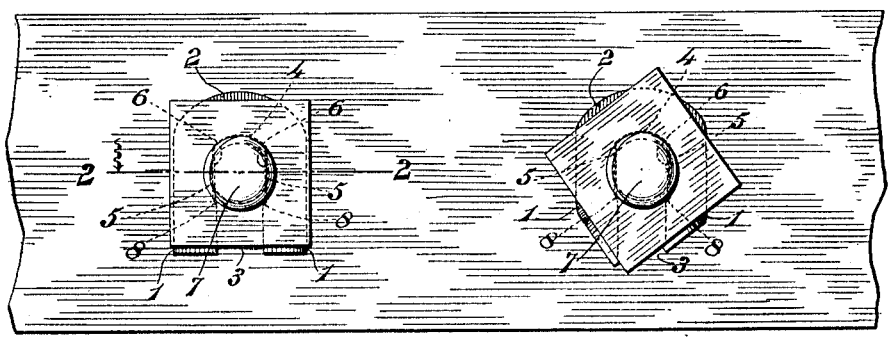
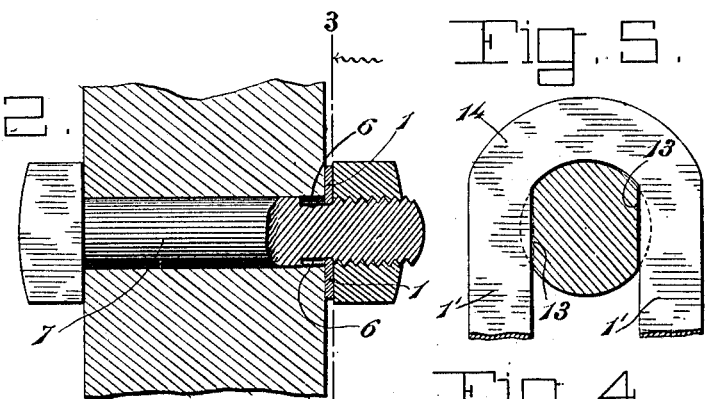
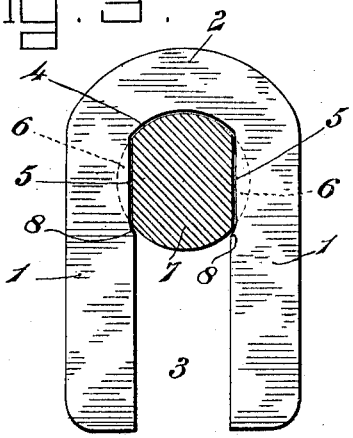 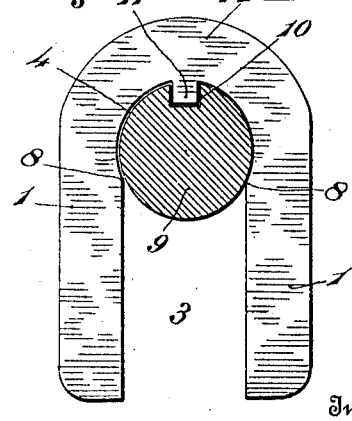
Inventor
Oliver H. P. G. Spencer
Witnesses
By Victor J. Evans
Attorney

UNITED STATES PATENT OFFICE.

OLIVER H. P. G. SPENCER, OF COLUMBUS, OHIO, ASSIGNOR OF ONE-THIRD TO WILLIAM DANIEL BRESNAHAN AND ONE-THIRD TO HENRY WALTER BOYER, OF COLUMBUS, OHIO.

NUT-LOCK.

970,274.  Specification of Letters Patent.  Patented Sept. 13, 1910.

Application filed July 6, 1910. Serial No. 570,635.

*To all whom it may concern:*

Be it known that I, OLIVER H. P. G. SPENCER, a citizen of the United States of America, residing at Columbus, in the county of Franklin and State of Ohio, have invented new and useful Improvements in Nut-Locks, of which the following is a specification.

This invention relates to nut locks, and has for an object to provide a device of this character which may be stamped from suitable sheet metal designed to be engaged with the bolt and with the nut to hold the latter against rotation.

A still further object of the invention is to provide a spring-like washer-plate constructed to form a pair of spring-gripping members for engaging the bolt so as to hold the lock against displacement from the bolt before adjustment of the nut thereon.

In the drawing, forming a portion of this specification and in which like numerals of reference indicate similar parts in the several views:—Figure 1 is a front elevation showing a plurality of bolts and illustrating the manner in which my improved lock can be used on nuts having different adjustments on their respective bolts. Fig. 2 is a detail section taken on the line 2—2 of Fig. 1. Fig. 3 is a detail section taken on the line 3—3 of Fig. 2. Fig. 4 is a view similar to Fig. 3 illustrating a slightly modified form of my invention. Fig. 5 is a transverse section through the bolt showing a slightly modified form of my invention.

Upon reference particularly to Figs. 1 to 3 inclusive of the drawing, the nut lock consists essentially of what may be termed a washer-plate. This plate is stamped from a single piece of suitable sheet metal to provide a pair of spaced slightly resilient arms 1 which are connected with each other by the curved body portion 2. The slot 3 between the arms 1 is extended into the concavity 4. This concavity is formed with flattened side portions 5 to engage the correspondingly flattened walls of the longitudinally extending grooves 6 in the bolt 7. The grooves 6 are preferably located on opposite sides of the said bolt at a point immediately at the inner extremity of the threaded portion of such bolt, and as illustrated, each groove is of a length considerably greater than the thickness of the washer-plate for a purpose to be hereinafter described. The engagement of the washer-plate against the flattened faces of the grooves 6 effectively prevents rotation of such plate on the bolt. By constructing the washer-plate to form the concavity 4 which is of a width greater than that of the slot 3, gripping portions 8 are formed and designed to hug the bolt sufficiently to prevent casual displacement of the washer-plate from the bolt before adjustments of the nut thereon. After the nut has been adjusted on the threaded portion of the bolt to a position where it will lie in frictional engagement with the washer-plate the extremities of the arms 1 may be bent into engagement with the flat side faces of the nut to hold the nut against rotation.

In the form of my invention shown in Fig. 4, the bolt 9 has formed therein a longitudinally extending groove 10 in which the stud 11 of the washer-plate 12 is fitted. In view of the provision of the longitudinally extending groove 10 it will be understood that on wear of the object with which the bolt is engaged further adjustment of the nut can be readily obtained, it being obvious that the washer-plate is mounted for slight longitudinal movement on the bolt.

In the modified form of my invention shown in Fig. 5, the bolt is provided with flat faces 13 with which the washer-plate 14 is engaged. This washer plate is somewhat similar to that described in the preferred form of my invention but in this instance, the arms 1' are parallel substantially throughout. This plate is preferably of U-form and the arms 1' may be bent into engagement with the nut in a manner identically the same as that previously described.

I claim:—

1. In a nut lock, the combination with a bolt having a longitudinal slot therein, a washer-plate having a portion fitting the slot so as to hold the plate against rotation on the bolt, and a pair of spaced legs formed on said plate and bent at their extremities to engage the nut of the bolt to hold the same against rotation.

2. In a nut lock, the combination with a bolt having an adjustable nut, of a washer-plate having a pair of spaced arms straddling the said bolt, the said arms being spaced from each other to form a longitudinally extending slot, the said plate having a bolt-receiving concavity therein whose walls partly surround the said bolt to hold the plate in its adjusted position on the bolt, and coöperating means on the washer-plate and bolt respectively for holding the plate against rotation, the said arms of the plate having their extremities bent into locking engagement with the nut.

In testimony whereof I affix my signature in presence of two witnesses.

OLIVER H. P. G. SPENCER.

Witnesses:
C. B. SHOOK,
GRANT ALLISON.